United States Patent [19]

Hwang

[11] Patent Number: 6,023,298

[45] Date of Patent: Feb. 8, 2000

[54] VIDEO SIGNAL ENCODING SYSTEM USING A CURRENT FRAME PREDICTION APPARATUS

[75] Inventor: Duck-Dong Hwang, Seoul, Rep. of Korea

[73] Assignee: Daewoo Electronics Co., Ltd, Rep. of Korea

[21] Appl. No.: 08/828,736

[22] Filed: Mar. 21, 1997

[30] Foreign Application Priority Data

Mar. 22, 1996 [KR] Rep. of Korea .................. 96-7968
Mar. 22, 1996 [KR] Rep. of Korea .................. 96-7977

[51] Int. Cl.⁷ .................................................. H04N 7/12
[52] U.S. Cl. ..................... 348/409; 348/413; 348/699; 382/263; 382/266
[58] Field of Search ................................ 348/405, 416, 348/699; 382/263, 266, 275, 254; 358/477, 463, 133; 395/800; 364/514 R; H04N 7/72

[56] References Cited

U.S. PATENT DOCUMENTS

| 5,136,376 | 8/1992 | Yagasaki et al. | 358/133 |
|---|---|---|---|
| 5,311,310 | 5/1994 | Jozawa et al. | 348/416 |
| 5,500,689 | 3/1996 | Lam | 348/699 |
| 5,504,931 | 4/1996 | Furtek | 395/800 |
| 5,602,593 | 2/1997 | Katto | 348/416 |
| 5,608,652 | 3/1997 | Astle | 364/514 |

*Primary Examiner*—Bryan Tung
*Assistant Examiner*—Tung Vo
*Attorney, Agent, or Firm*—Anderson Kill & Olick

[57] ABSTRACT

A current frame containing a multiplicity of current block signals is predicted based on a previous frame by employing an apparatus which produces a predicted current block signal corresponding to each of the current block signals. The apparatus first calculates a correlation factor depicting an improved correlation between the current block signal and a corresponding predicted block signal selected from the previous frame based on an estimation of the motion between the current and the previous frames. Once the correlation factor is computed, the predicted current block signal is determined based on the correlation factor and the current and the predicted block signals.

18 Claims, 3 Drawing Sheets

VIDEO SIGNAL ENCODING SYSTEM USING A CURRENT FRAME PREDICTION APPARATUS

FIELD OF THE INVENTION

The present invention relates to an apparatus for encoding a video signal; and, more particularly, to an improved current frame prediction apparatus for producing more accurately predicted current frame data.

DESCRIPTION OF THE PRIOR ART

As is well known, transmission of digitized video signals can deliver video images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amount of digital data through the limited channel bandwidth, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse code modulation), two-dimensional DCT(discrete cosine transform), quantization of DCT coefficients, and VLC(variable length coding). The motion compensated DPCM is a process of determining the movement of an object between a current frame and a previous frame, and predicting the current frame according to the motion flow of the object to produce a differential signal representing the difference between the current frame and its prediction. This method is described, for example, in Staffan Ericsson, "Fixed and Adaptive Predictors for Hybrid Predictive/Transform Coding", *IEEE Transactions on Communications, COM*-33, No. 12 (December 1985); and in Ninomiya and Ohtsuka, "A Motion-Compensated Interframe Coding Scheme for Television Pictures", *IEEE Transactions on Communications, COM*-30, No. 1 (January 1982).

Specifically, in the motion compensated DPCM, current frame data is predicted from the corresponding previous frame data based on an estimation of the motion between the current and the previous frames. Such estimated motion may be described in terms of two dimensional motion vectors representing the displacement of pixels between the previous and the current frames. Then, a predicted current frame is constructed by combining parts of the previous frame which are similar to the current frame by using the two dimensional motion vectors; and the differential signal representing the difference between the current frame and its prediction, i.e., the predicted current frame, is determined.

In the above motion compensated DPCM, however, since the predicted current frame used to produce the differential signal is constructed based only on the previous frame and the motion vectors, if there is an error in the motion vectors, the predicted current frame may become substantially different from the current frame.

SUMMARY OF THE INVENTION

It is, therefore, an object of the present invention to provide an apparatus for effectively predicting current frame data by incorporating an enhanced correlation between corresponding pixel values in a current frame and a previous frame.

It is another object of the present invention to provide a video signal encoder employing an apparatus for effectively predicting current frame data by using an enhanced correlation between corresponding pixel values in a current frame and a previous frame.

In accordance with one aspect of the present invention, there is provided an apparatus, for use in a video signal encoding system, for generating a predicted current block signal based on a current frame and a previous frame, wherein the current and the previous frames are included in a video signal having a multiplicity of frames, each of the frames being divided into a plurality of blocks having N×M pixel values with N and M being positive integers, respectively, which comprises: a current block signal provider for supplying each of the blocks in the current frame as a current block signal; a predicted block signal selector for choosing one of the blocks, similar to the current block signal, in the previous frame as a predicted block signal; a correlation factor calculator for determining a correlation factor depicting an improved correlation between corresponding pixel values in the current and the predicted block signals; and a predicted current block signal generator for producing the predicted current block signal based on the correlation factor and the current and the predicted block signals.

In accordance with another aspect of the present invention, there is provided a video signal encoder for coding a video signal, wherein the video signal contains a current and a previous frames, each of the frames being divided into a plurality of blocks having N×M pixel values with N and M being positive integers, respectively, comprising: a provider for supplying each of the blocks in the current frame as a current block signal; a selector for choosing one of the blocks, similar to the current block signal, in the previous frame as a predicted block signal and supplying a motion vector representing a displacement between the current and the predicted block signals; a generator for producing a predicted current block signal and compensation information based on the current and the predicted block signals, wherein the predicted current block signal is generated based on an improved correlation between corresponding pixel values in the current and the predicted block signals and the compensation information depicts the improved correlation; a calculator for computing a block difference signal denoting differential pixel values between the current block signal and the predicted current block signal; and an encoding sector for coding the block difference signal, motion vector and the compensation information to thereby provide an encoded video signal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
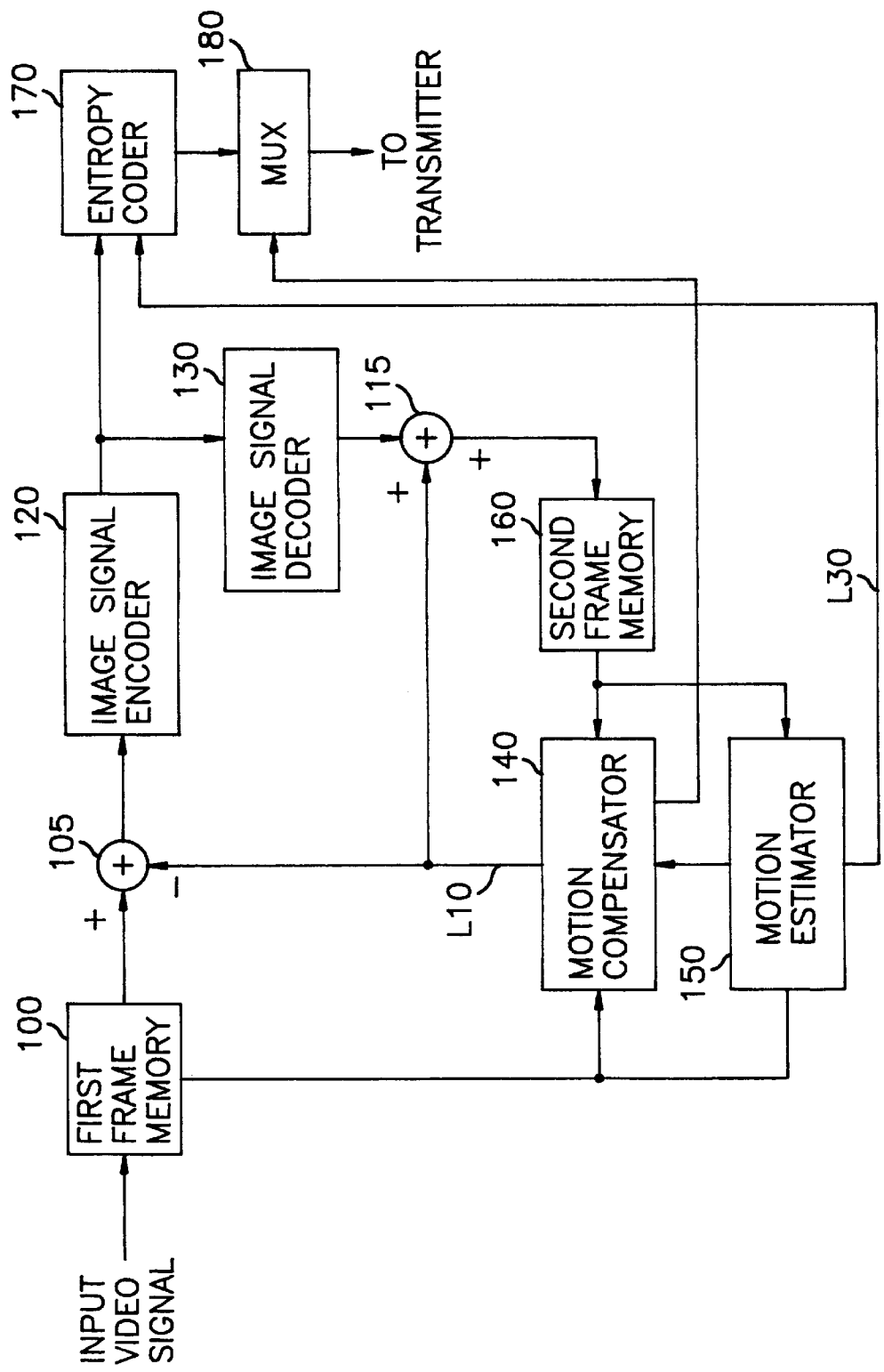
FIG. 1 is a block diagram of a video signal encoder employing a motion compensator of the present invention.

Referring to FIG. 1, there is shown a block diagram of a video signal encoder for coding an input video signal having a multiplicity of frames such as a current frame and a previous frame, wherein each of the frames is divided into a plurality of blocks each of which has N×M pixel values with N and M being positive integers, respectively. The input video signal is fed to a first frame memory 100 on a frame-by-frame basis for the storage thereof.

The first frame memory 100 sequentially provides a current block signal representing pixel values included in each of the blocks in a current frame stored therein to a subtracter 105, a motion compensator 140 and a motion estimator 150.

At the motion estimator 150, the current block signal retrieved from the first frame memory 100 and a previous frame data containing a plurality of previous block signals from a second frame memory 160 are processed to determine a motion vector for the current block signal through the use of a conventional motion estimation technique. The motion vector obtained at the motion estimator 150 is applied to the motion compensator 140 and an entropy coder 170 through a line L30.

The motion compensator 140 produces a predicted current block signal based on the current block signal from the first frame memory 100, the previous frame data from the second frame memory 160, and the motion vector supplied from the motion estimator 150.

Figure 2A:
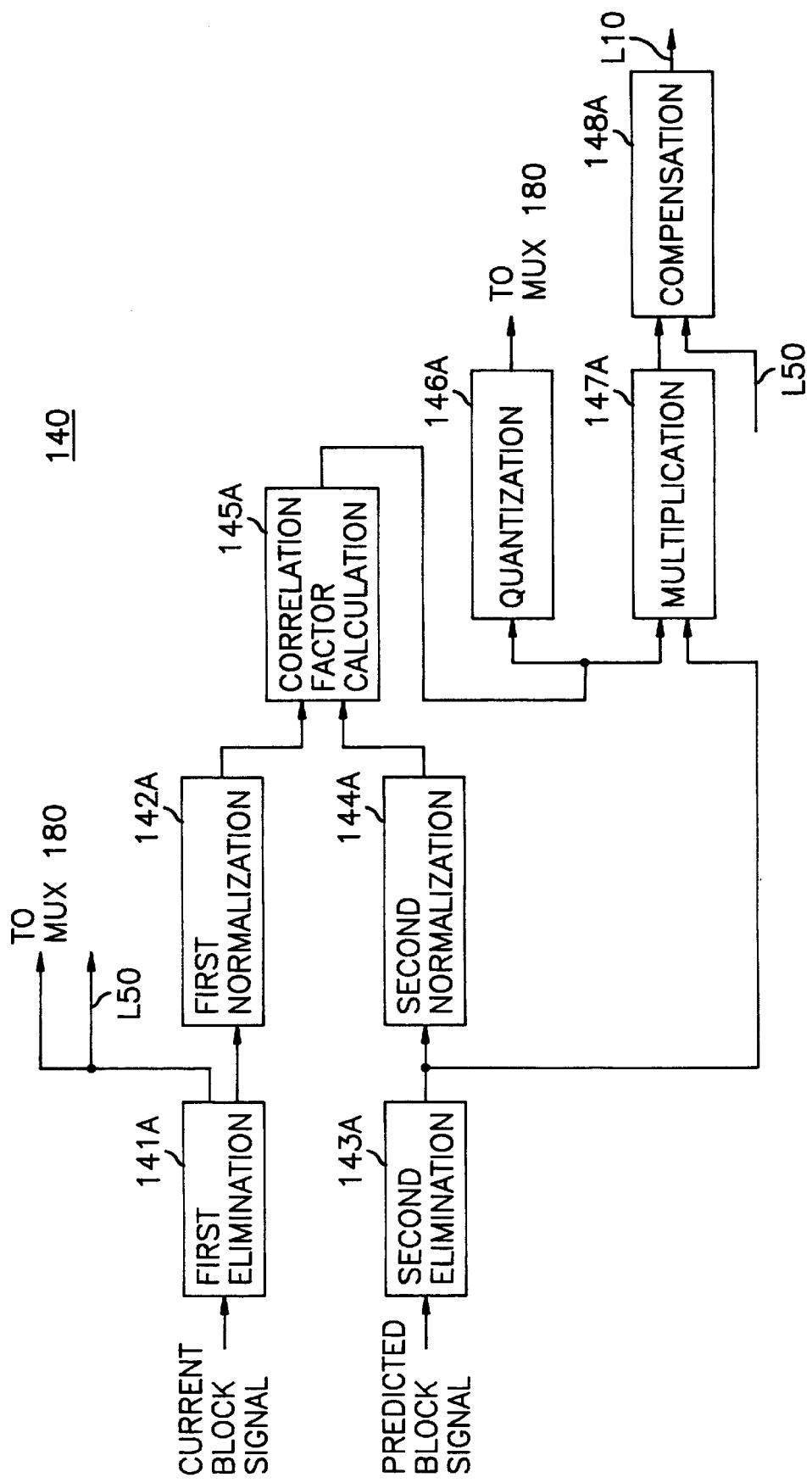
FIGS. 2A and 2B represent detailed block diagrams of the motion compensator in accordance with the preferred embodiments of the present invention, respectively.
Figure 2B:
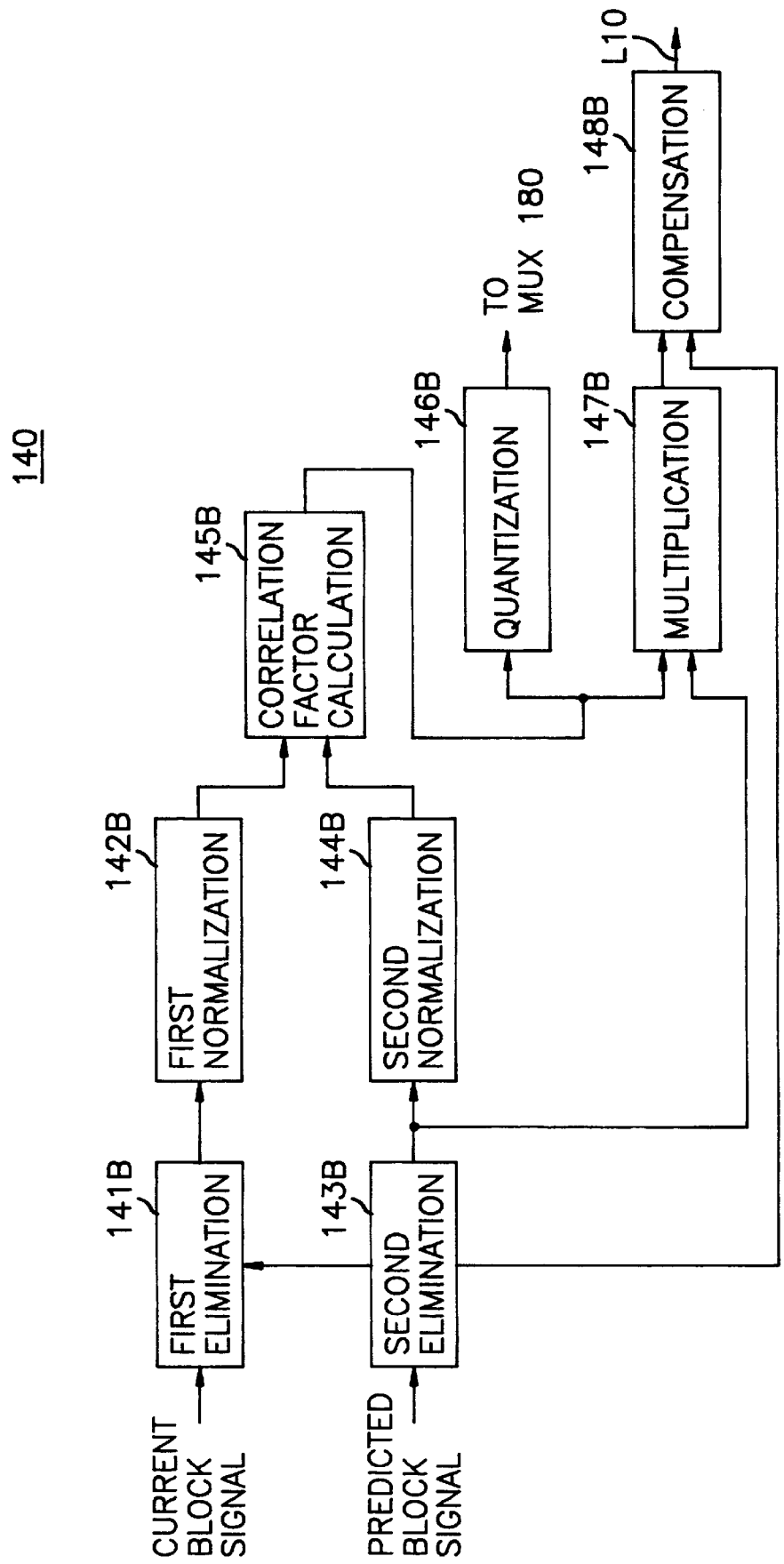

In FIGS. 2A and 2B, there are shown block diagrams of the motion compensator 140 in accordance with the preferred embodiments of the present invention, respectively. Details of the motion compensator 140 will be described with reference to the drawings.

First of all, the motion compensator 140 detects a predicted block signal corresponding to the current block signal based on the previous frame data and the motion vector by employing a conventional motion compensation technique although the procedure is not explicitly shown in FIGS. 2A and 2B. That is to say, one of blocks, similar to the current block signal, in the previous frame is selected as the predicted block signal. Then, the predicted block signal obtained above is fed to a corresponding second elimination sector, e.g., 143A in FIG. 2A or 143B in FIG. 2B.

Referring to FIG. 2A, the first elimination sector 141A, according to a preferred embodiment of the present invention, calculates a first determined value, e.g., a mean value of all pixel values in the current block signal provided from the first frame memory 100; and subtracts the first determined value from each of the pixel values in the current block signal to thereby produce an eliminated current block signal. The first determined value is provided to a compensation sector 148A via a line L50 and a multiplexer 180 shown in FIG. 1 and the eliminated current block signal is transferred to a first normalization sector 142A.

Similarly, the second elimination sector 143A ciphers a second determined value, e.g., a mean value of all pixel values in the predicted block signal; generates an eliminated predicted block signal by subtracting the second determined value from each of the pixel values in the predicted block signal; and provides the eliminated predicted block signal to a second normalization sector 144A and a multiplication sector 147A.

At the first normalization sector 142A, in order to generate a normalized current block signal, each of pixel values in the eliminated current block signal is normalized, e.g., as follows:

$$I_n(i, j) = \frac{I(i, j)}{\sqrt{\sum_{i=1}^{N} \sum_{j=1}^{M} I(i, j)^2}} \quad \text{EQ. 1}$$

wherein I(i,j) depicts a pixel value at a position coordinate (i,j) in the eliminated current block signal, i and j being integers representing the pixel position in the block; and $I_n(i,j)$ represents a normalized pixel value of I(i,j).

Likewise, the second normalization sector 144A also normalizes each of pixel values in the eliminated predicted block signal in the same manner as shown in EQ. 1 so as to produce a normalized predicted block signal.

The normalized current and predicted block signals are coupled to a correlation factor calculation sector 145A which determines an inner product therebetween as a correlation factor. The correlation factor, i.e., the inner product of the two block signals is calculated, e.g., as follows:

$$S = \sum_{i=1}^{N} \sum_{j=1}^{M} I_{nc}(i, j) \times I_{np}(i, j) \quad \text{EQ. 2}$$

wherein S represents the inner product; $I_{nc}(i,j)$ represents a normalized pixel value at a position coordinate (i,j) in the normalized current block signal; and $I_{np}(i,j)$ depicts a normalized pixel value at a position coordinate (i,j) in the normalized predicted block signal.

The inner product S is supplied to the multiplication sector 147A and a quantization sector 146A. The inner product S is quantized at the quantization sector 146A and then transferred to the multiplexer 180.

At the multiplication sector 147A, the eliminated predicted block signal from the second elimination sector 143A is multiplied by the inner product S and the multiplied resultant is delivered to the compensation sector 148A.

The compensation sector 148A produces the predicted current block signal by adding the first determined value transferred through the line L50 to the multiplied resultant derived at the multiplication sector 147A and provides the predicted current block signal onto a line L10.

On the other hand, referring to FIG. 2B, there is presented a detailed block diagram of the motion compensator 140 in accordance with another preferred embodiment of the present invention. Since, however, the operations of processing devices constituting the motion compensator 140 shown in FIG. 2B are similar to those of devices in FIG. 2A which have already been introduced with reference to FIG. 2A, the procedures commonly performed in the preferred embodiments given in conjunction with FIGS. 2A and 2B will be briefly mentioned and, hereinafter, the procedures carried out differently at the motion compensator shown in FIG. 2B from those at the motion compensator shown in FIG. 2A will be extensively described with reference to the drawing.

In this case, the motion compensator 140 also detects a predicted block signal corresponding the current block signal by using the previous frame data and the motion vector in the aforementioned motion compensation technique as mentioned above. The current block signal and the predicted block signal are fed to a first and a second elimination sectors 141B and 143B.

The second elimination sector 143B computes a determined value by using a mean value of all pixel values in the predicted block signal and produces an eliminated predicted block signal as described above with respect to FIG. 2A, which, in turn, is supplied to a second normalization sector 144B.

The first elimination sector 141B subtracts the determined value derived at the second elimination sector 143B from each of the pixel values in the current block signal to thereby produce an eliminated current block signal to be transferred to a first normalization sector 142B.

The first and the second normalization sectors 142B and 144B normalize the eliminated current block signal and the eliminated predicted block signal to thereby produce a normalized current block signal and a normalized predicted block signal, respectively.

The normalized current and predicted block signals are then provided to a correlation factor calculation sector 145B and a correlation factor therebetween is determined through the use of EQ. 2 as has been described above. The correlation factor is transferred to a quantization sector 146B and a multiplication sector 147B and then processed as aforementioned descriptions.

At a compensation sector 148B, the predicted current block signal is determined by adding the determined value transferred from the second elimination sector 143B to a multiplied resultant derived at the multiplication sector 147B and coupled onto a line L10.

In the above processes of producing the predicted current block signal with reference to FIGS. 2A and 2B, since the eliminated block signal, e.g., the eliminated current block signal or the eliminated predicted block signal, is determined by subtracting the determined value, e.g., the first or the second determined value, from each of the pixel values in the block signal, e.g., the current or the predicted block signal, it contains only differential values between pixel values in the block signal. And, as shown in EQ. 2, since the correlation factor is determined by the normalized current and predicted block signals, it reflects a correlation between corresponding pixel values in the current and the predicted block signals, and, accordingly, so does the predicted current block signal produced by the above processes.

Referring back to FIG. 1, the predicted current block signal transferred via the line L10 is subtracted from the current block signal at the subtracter 105; and the resultant data, i.e., a block difference signal denoting differential pixel values between the current block signal and the predicted current block signal, is dispatched to an image signal encoder 120, wherein the block difference signal is encoded into a set of quantized transform coefficients, e.g., by using a discrete cosine transform (DCT) and any of the known quantization methods.

Thereafter, the quantized transform coefficients are transmitted to the entropy coder 170 and an image signal decoder 130. At the entropy coder 170, the quantized transform coefficients from the image signal encoder 120 and the motion vector supplied through the line L30 are coded together by using, e.g., a combination of run-length and variable length coding techniques. The coded data from the entropy coder 170 and the output, e.g., the correlation factor and the first determined value, or the correlation factor, from the motion compensator 140 are multiplexed at the multiplexer 180 and provided to the transmitter(not shown) for the transmission thereof.

In the meantime, the image signal decoder 130 converts the quantized transform coefficients from the image signal encoder 120 back into a reconstructed block difference signal by employing an inverse quantization and an inverse DCT.

The reconstructed block difference signal from the image signal decoder 130 and the predicted current block signal from the motion compensator 140 are combined at an adder 115 to thereby provide a reconstructed current block signal to be written as a previous block signal onto the second frame memory 160.

While the present invention has been described with respect to the particular embodiments, it will be apparent to those skilled in the art that various changes and modifications may be made without departing from the spirit and scope of the invention as defined in the following claims.

What is claimed is:

1. An apparatus, for use in a video signal encoding system, for generating a predicted current block signal based on a current frame and a previous frame, wherein the current and the previous frames are included in a video signal having a multiplicity of frames, each of the frames being divided into a plurality of blocks having N×M pixel values with N and M being positive integers, respectively, which comprises:

means for providing each of the blocks in the current frame as a current block signal;

means for selecting one of the blocks, similar to the current block signal, in the previous frame as a predicted block signal;

means for determining a correlation factor depicting correlation between corresponding pixel values in the current and the predicted block signals; and means for producing the predicted current block signal based on the correlation factor and the current and the predicted block signals, wherein the correlation factor determining means includes:

means for calculating a first determined value based on the current block signal;

means for ciphering a second determined value based on the predicted block signal;

means for producing an eliminated current block signal by subtracting the first determined value from each of the pixel values in the current block signal;

means for generating an eliminated predicted block signal by subtracting the second determined value from each of the pixel values in the predicted block signal;

means for normalizing the eliminated current and predicted block signals to thereby provide a normalized current and a normalized predicted block signals, respectively; and means for calculating the correlation factor based on the normalized current and predicted block signals.

2. The apparatus according to claim 1, wherein each of the first and the second determined values is determined by calculating a mean value of pixel values in each of the current and the predicted block signals, respectively.

3. The apparatus according to claim 2, wherein the predicted current block signal producing means includes:

means for multiplying the eliminated predicted block signal by the correlation factor to thereby produce a multiplied predicted block signal; and means for determining the predicted current block signal by adding the first determined value to the multiplied predicted block signal.

4. The apparatus according to claim 3, wherein the normalized current block signal is determined by normalizing each of pixel values in the eliminated current block signal as:

$$I_n(i, j) = \frac{I(i, j)}{\sqrt{\sum_{i=1}^{N} \sum_{j=1}^{M} I(i, j)^2}}$$

wherein I(i,j) depicts a pixel value at a position coordinate (i,j) in the eliminated current block signal, i and j being integers representing the pixel position in the block; and $I_n(i,j)$ represents a normalized pixel value of I(i,j).

5. The apparatus according to claim 4, wherein the normalized predicted block signal is determined based on the eliminated predicted block signal by using the same manner used in the generation of the normalized current block signal.

6. The apparatus according to claim 5, wherein the correlation factor is calculated as:

$$S = \sum_{i=1}^{N} \sum_{j=1}^{M} I_{nc}(i, j) \times I_{np}(i, j)$$

wherein S represents the correlation factor; $I_{nc}(i,j)$ shows a normalized pixel value at a position coordinate (i,j) in the normalized current block signal; and $I_{np}(i,j)$ depicts a normalized pixel value at a position coordinate (i,j) in the normalized predicted block signal.

7. An apparatus, for use in a video signal encoding system, for generating a predicted current block signal based on a current frame and a previous frame, wherein the current and the previous frames are included in a video signal having a multiplicity of frames, each of the frames being divided into a plurality of blocks having N×M pixel values with N and M being positive integers, respectively, which comprises:

means for providing each of the blocks in the current frame as a current block signal;

means for selecting one of the blocks, similar to the current block signal, in the previous frame as a predicted block signal;

means for determining a correlation factor depicting correlation between corresponding pixel values in the current and the predicted block signals; and means for producing the predicted current block signal based on the correlation factor and the current and the predicted block signals, wherein the correlation factor determining means includes:

means for ciphering a determined value based on the predicted block signal;

means for producing an eliminated current block signal by subtracting the determined value from each of the pixel values in the current block signal;

means for generating an eliminated predicted block signal by subtracting the determined value from each of the pixel values in the predicted block signal;

means for normalizing the eliminated current and predicted block signals to thereby provide a normalized current and a normalized predicted block signals, respectively; and means for calculating the correlation factor based on the normalized current and predicted block signals.

8. The apparatus according to claim 7, wherein the determined value is determined by ciphering a mean value of pixel values in the predicted block signal.

9. The apparatus according to claim 8, wherein the predicted current block signal producing means includes:

means for multiplying the eliminated predicted block signal by the correlation factor to thereby produce a multiplied predicted block signal; and means for determining the predicted current block signal by adding the determined value to the multiplied predicted block signal.

10. A video signal encoder for coding a video signal, wherein the video signal contains a current frame and a previous frame and each frame is divided into a plurality of blocks having N×M pixel values with N and M being positive integers, respectively, comprising:

means for providing each of the blocks in the current frame as a current block signal;

means for selecting one of the blocks, similar to the current block signal, in the previous frame as a predicted block signal and supplying a motion vector representing a displacement between the current and the predicted block signals;

means for producing a predicted current block signal and compensation information based on the current and the predicted block signals, wherein the predicted current block signal is generated by using correlation between corresponding pixel values in the current and the predicted block signals and the compensation information depicts the correlation;

means for calculating a block difference signal denoting differential pixel values between the current block signal and the predicted current block signal; and means for encoding the block difference signal, the motion vector and the compensation information to thereby provide an encoded video signal, wherein the producing means includes:

means for calculating a first determined value based on the current block signal;

means for ciphering a second determined value based on the predicted block signal;

means for producing an eliminated current block signal by subtracting the first determined value from each of the pixel values in the current block signal;

means for generating an eliminated predicted block signal by subtracting the second determined value from each of the pixel values in the predicted block signal;

means for normalizing the eliminated current and predicted block signals to thereby provide a normalized current and a normalized predicted block signals, respectively;

means for calculating the correlation factor based on the normalized current and predicted block signals;

means for generating the predicted current block signal based on the correlation factor, the eliminated predicted block signal and the first determined value;

means for quantizing the correlation factor; and means for providing the quantized correlation factor and the first determined value as the compensation information.

11. The video signal encoder as recited in claim 10, wherein each of the first and the second determined values is determined by computing a mean value of pixel values in each of the current and the predicted block signals, respectively.

12. The video signal encoder as recited in claim 11, wherein the predicted current block signal generating means includes:

means for multiplying the eliminated predicted block signal by the correlation factor to thereby produce a multiplied predicted block signal; and means for determining the predicted current block signal by adding the first determined value to the multiplied predicted block signal.

13. The video signal encoder as recited in claim 12, wherein the normalized current block signal is determined by normalizing each of pixel values in the eliminated current block signal as:

$$I_n(i, j) = \frac{I(i, j)}{\sqrt{\sum_{i=1}^{N}\sum_{j=1}^{M} I(i, j)^2}}$$

wherein I(i,j) depicts a pixel value at a position coordinate (i,j) in the eliminated current block signal; and $I_n$(i,j) represents a normalized pixel value of I(i,j).

14. The apparatus as recited in claim 13, wherein the normalized predicted block signal is determined based on the eliminated predicted block signal by using the same manner used in the generation of the normalized current block signal.

15. The video signal encoder as recited in claim 14, wherein the correlation factor is calculated as:

$$S = \sum_{i=1}^{N}\sum_{j=1}^{M} I_{nc}(i, j) \times I_{np}(i, j)$$

wherein S represents the correlation factor; $I_{nc}$(i,j) shows a normalized pixel value at a position coordinate (i,j) in the normalized current block signal; and $I_{np}$(i,j) depicts a normalized pixel value at a position coordinate (i,j) in the normalized predicted block signal.

16. A video signal encoder for coding a video signal, wherein the video signal contains a current frame and a previous frame and each frame is divided into a plurality of blocks having N×M pixel values with N and M being positive integers, respectively, comprising:

means for providing each of the blocks in the current frame as a current block signal;

means for selecting one of the blocks, similar to the current block signal, in the previous frame as a predicted block signal and supplying a motion vector representing a displacement between the current and the predicted block signals;

means for producing a predicted current block signal and compensation information based on the current and the predicted block signals, wherein the predicted current block signal is generated by using correlation between corresponding pixel values in the current and the predicted block signals and the compensation information depicts the correlation;

means for calculating a block difference signal denoting differential pixel values between the current block signal and the predicted current block signal; and means for encoding the block difference signal, the motion vector and the compensation information to thereby provide an encoded video signal, wherein the producing means includes:

means for ciphering a determined value based on the predicted block signal;

means for producing an eliminated current block signal by subtracting the determined value from each of the pixel values in the current block signal;

means for generating an eliminated predicted block signal by subtracting the determined value from each of the pixel values in the predicted block signal;

means for normalizing the eliminated current and predicted block signals to thereby provide a normalized current and a normalized predicted block signals, respectively;

means for calculating the correlation factor based on the normalized current and predicted block signals;

means for generating the predicted current block signal based on the correlation factor, the eliminated predicted block signal and the determined value;

means for quantizing the correlation factor; and means for providing the quantized correlation factor as the compensation information.

17. The video signal encoder as recited in claim 16, wherein the determined value is determined by calculating a mean value of pixel values in the predicted block signal.

18. The video signal encoder as recited in claim 17, wherein the predicted current block signal generating means includes:

means for multiplying the eliminated predicted block signal by the correlation factor to thereby produce a multiplied predicted block signal; and means for determining the predicted current block signal by adding the determined value to the multiplied predicted block signal.

* * * * *